United States Patent
Blakely et al.

(10) Patent No.: US 7,907,375 B2
(45) Date of Patent: Mar. 15, 2011

(54) SELF POWERED ELECTRONIC OVERLOAD METHOD AND SYSTEM

(75) Inventors: John Herman Blakely, Weaverville, NC (US); Gregory A. Helton, Asheville, NC (US); Mark Innes, Asheville, NC (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 198 days.

(21) Appl. No.: 12/242,479

(22) Filed: Sep. 30, 2008

(65) Prior Publication Data

US 2010/0079922 A1   Apr. 1, 2010

(51) Int. Cl.
*H02H 5/04* (2006.01)
(52) U.S. Cl. ............................................. 361/87; 361/23
(58) Field of Classification Search .................. 361/23, 361/87, 42–50
See application file for complete search history.

(56) References Cited

U.S. PATENT DOCUMENTS

| | | | | |
|---|---|---|---|---|
| 4,271,447 A | * | 6/1981 | Howell | 361/93.7 |
| 4,603,367 A | * | 7/1986 | Muller | 361/98 |
| 2008/0215278 A1 | * | 9/2008 | Colsch et al. | 702/85 |

* cited by examiner

*Primary Examiner* — Danny Nguyen
(74) *Attorney, Agent, or Firm* — Fletcher Yoder LLP; Alexander R. Kuszewski; John M. Miller

(57) ABSTRACT

A sensing and switching device, such as an overload relay, is provided which includes a processor configured to make measurements and control operation (e.g., tripping) of the device. The processor regulates measurement of voltage and/or current, and the supply of power to power supplies. The power supplies store charge to provide operational power for the processor and that can be used for tripping and resetting contacts within the device. The processor opens a burden resistor measurement circuit when charge is being stored in the power supplies, and opens switches in the power supplies while closing the burden resistor switch to permit measurements. By alternatively switching for charging of the power supplies and making of measurements, the processor is able to reliably make measurements, control the device, and store sufficient power for operation of the device despite a demanding power budget.

27 Claims, 2 Drawing Sheets

SELF POWERED ELECTRONIC OVERLOAD METHOD AND SYSTEM

BACKGROUND

The present invention relates generally to protective circuitry, such as overload circuits. More particularly, the invention relates to a processor-based overload relay that is self-powered by virtue of power management components, permitting power to be stored for its operation, while performing measurements of voltage and current.

Overload relays and similar circuits are used in a wide range of settings. For example, applications involving powering electric motors, a motor starter or motor controller is typically coupled to a motor to supply single or three-phase power. The motor drive, in many applications, may synthesize an output waveform to vary the frequency of the drive power so as to permit the motor to be driven at various speeds. The waveform may also be manipulated to control torque, and so forth. Motor controllers, however, do not typically provide for interrupting power to the motor in case of need. Depending upon the circuit configuration, other protective devices typically serve this purpose. Such devices may include fuses that are often positioned upstream of all other circuitry and downstream of a power supply, such as the electric power grid. The fuses may be supplemented by magnetic and thermal overload circuitry. Magnetic overload circuitry typically trips to open the power circuit in response to rapid changes in current. Other overload circuitry may operate more slowly, and may model motor windings or other wiring, to permit opening of the circuitry should longer-term rises in temperature be detected or estimated.

In the area of overload relays, a number of different configurations have been developed and are presently in use. Such relays can vary from quite simple electro-mechanical devices to more sophisticated circuitry that incorporates application specific integrated circuits (ASICs), or processors, typically microprocessors. Such ASICs and processors offer a significant benefit in being capable of analyzing current and voltage data and judiciously opening or closing power circuits based upon the analysis. Where possible, sophisticated yet high production (and thus cost effective) processors, including microprocessors and field programmable gate arrays may be used for such purposes.

One challenge in the use of such circuitry, however, is the ability to provide sufficient power for its operation. Specifically, smaller sizes of overload relays may not be able to provide sufficient power for operation of microprocessor-based control circuitry. In many cases, it is advantageous to power the circuitry from power that is extracted or scavenged from the sensing devices, such as current transformers. However, where power levels required for the processing exceed the available power budget, more costly and less flexible ASICs and other circuitry may be required.

There is a need, therefore, for improved circuit designs that may permit the use of more sophisticated processing capabilities that are powered by current transformers and similar power scavenging devices. There is a particular need for such circuitry that may permit microprocessors and similar circuits to be used in small electro-mechanical devices, such as overload relays, that have a reduced power budget.

BRIEF DESCRIPTION

The present invention provides novel circuitry that can be used in overload relays and similar devices configured to respond to such needs. The circuitry may be used in a wide range of settings, but is particularly well-suited to devices where currents and/or voltages are measured and where circuit interruption is powered by power scavenged from the measurement circuits. In accordance with certain aspects of the invention, a processor implements a power management scheme in which a measurement circuit is periodically switched, along with power supply circuitry. The power supply circuitry may include power storage devices, such as capacitors, and more than one power supply circuit may be powered, such as one for operational power and one for tripping and resetting the circuitry. The measurement circuitry may include a burden resistor that is switched into an out of the power supply line from sensors in order to make periodic voltage measurements that are proportional to current. The power may also be provided, in the alternative, from add-on devices or networked option modules which are coupled to the processor, but for which the scavenging power supplies do not have sufficient power.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
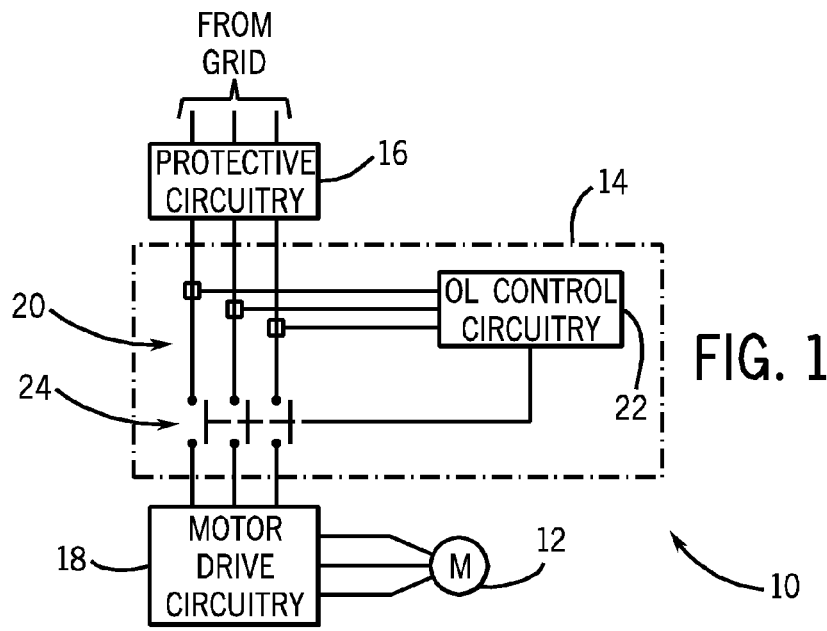
FIG. 1 is a diagrammatical representation of power supply circuitry in a motor application incorporating a relay in accordance with aspects of the present techniques.

Turning now to the drawings, and referring first to FIG. 1, power circuitry 10 is generally illustrated for supplying power to a motor 12. The power circuitry may be designed for stand-alone operation, or may be part of an overall control system, such as in industrial, commercial, material handling, or any other suitable applications (e.g., coupled to other components and networked to remote monitoring and control equipment). The circuitry includes an overload relay, designated generally by reference numeral 14, that senses voltage and current provided to the motor and that may open the power supply circuitry based upon actual or anticipated overload conditions. The overload relay 14 may be used with other protective circuitry, indicated generally by reference numeral 16. Such protective circuitry, which may include fuses, manual or automatic disconnects, and so forth will typically be positioned between the overload relay and a power source, such as the power grid. Three-phase power, in the illustrated embodiment, is provided to the protective circuitry, flows through the overload relay, and is then applied to motor drive circuitry 18 which powers the motor. The motor drive circuitry may include any suitable devices, such as across-the-line starters, soft starters, variable frequency motor drives, and so forth.

The overload relay 14, in the illustrated example of FIG. 1, utilizes a series of current transformers 20 which are coupled to the three-phase power conductors passing through the device. Any type of current transformer may be used for the application, such as transformers comprising multiple winds of wire positioned about or next to the three-phase power conductors. The coils of the current transformers effectively act as secondary windings of transformers, and carry current induced by fields generated by current through the three-phase power conductors. The current transformers 20 apply the sensed signals to control circuitry 22, described in greater detail below. The control circuitry 22 takes measurements of current and voltage, and includes a processor that can cause tripping of the device based upon actual or anticipated overload conditions. As also described below, the control circuitry regulates power for measurement and for operation of the device by a power management scheme. In the event of an overload condition, the overload control circuitry 22 can open contacts 24 in the device to interrupt power to the motor. Finally, the control circuit can output signals to energize coils 38 that operate to open or close the contacts of the relay, in a manner well understood to those skilled in the art.

Figure 2:
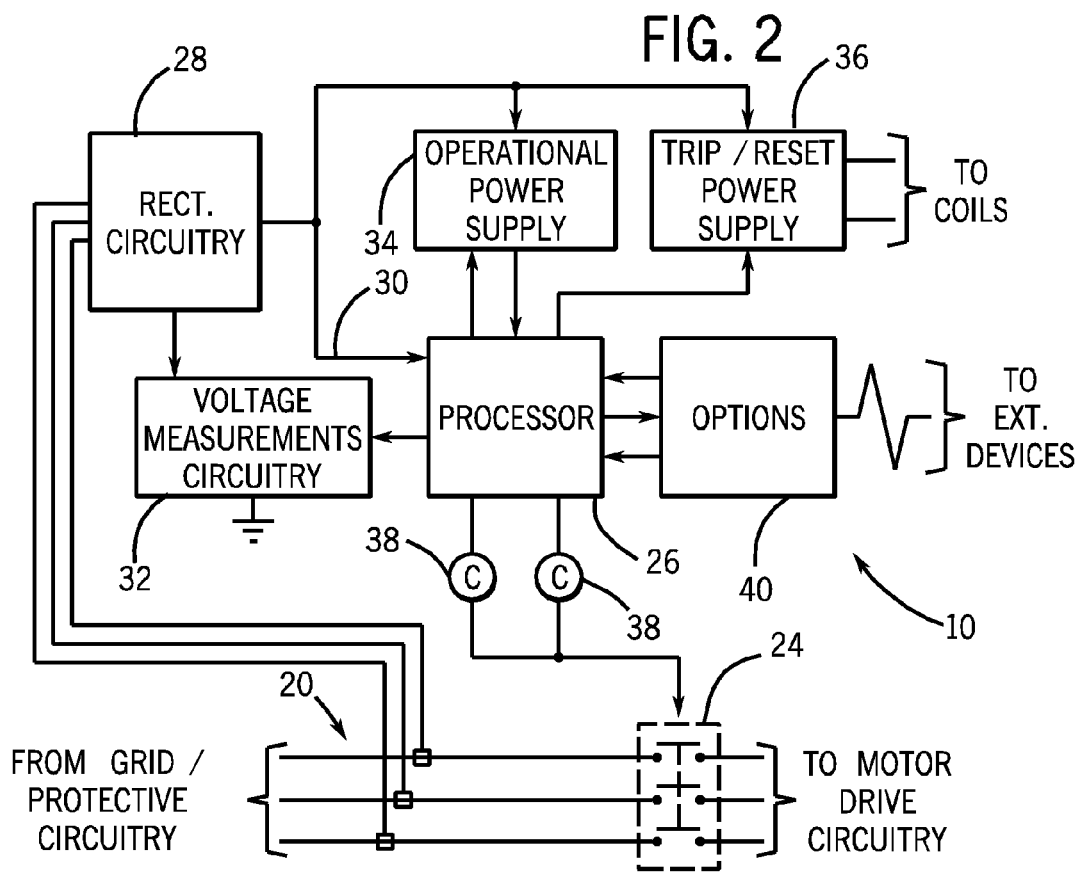
FIG. 2 is a diagrammatical representation of the circuitry of FIG. 1 in greater detail, illustrating voltage/current measurement circuitry and power supplies commanded by a processor.

As best illustrated in FIG. 2, the overload relay includes a processor 26 which serves to implement the power management scheme, and to analyze sensed data to determine when a condition exists that may warrant opening of the contacts 24. The processor is coupled to the current transformers via a rectification circuit 28. Because the waveform originating in the current transformers will reflect the sinusoidal waveform through the three-phase power conductors, rectification through circuit 28 serves to convert the three-phase AC power to DC power. A current measurement signal indicated by reference numeral 30 is applied to the processor 26 as output by the rectification circuit 28. Measurements necessary for the decisions implemented by the processor 26 are made by measurement circuit 32. The measurements made by the measurement circuit 32 are based upon current through a burden resistor in the circuit that is switched into and out of the circuitry as described more fully below.

As also illustrated in FIG. 2, the processor 26 is coupled to an operational power supply 34, and to a trip/reset power supply 36. The operational power supply and the trip/reset power supply are both coupled to the rectified power provided by the rectification circuit 28. In operation, power storage components, such as capacitors, within the operational power supply and the trip/reset power supply are charged under the direction of control signals from the processor 26, in coordination with measurement by the measurement circuit 32. The operational power supply 34, then, supplies power to the processor 26 during operation. The trip/reset power supply 36 stores and supplies power to open or close (i.e., reset) the contacts as commanded by the processor 26. This power supply, too, is charged under the direction of control signals provided by the processor 26.

In the illustrated embodiment, the processor 26 may also be coupled to various options, as indicated generally by reference numeral 40. Such options may include, for example, modules that may be coupled to, or plugged directly into the relay. Option modules presently contemplated may include inputs and outputs for communicating with the processor, remote reset devices, network interface devices, and so forth. Such option modules may then be coupled to external devices, such as remote control and monitoring equipment. In many applications such option modules may be separately powered, such as by a network link. As described more fully below, when this is the case, power from the network may be used to drive measurement and supply power for the power supply of the device.

Figure 3:
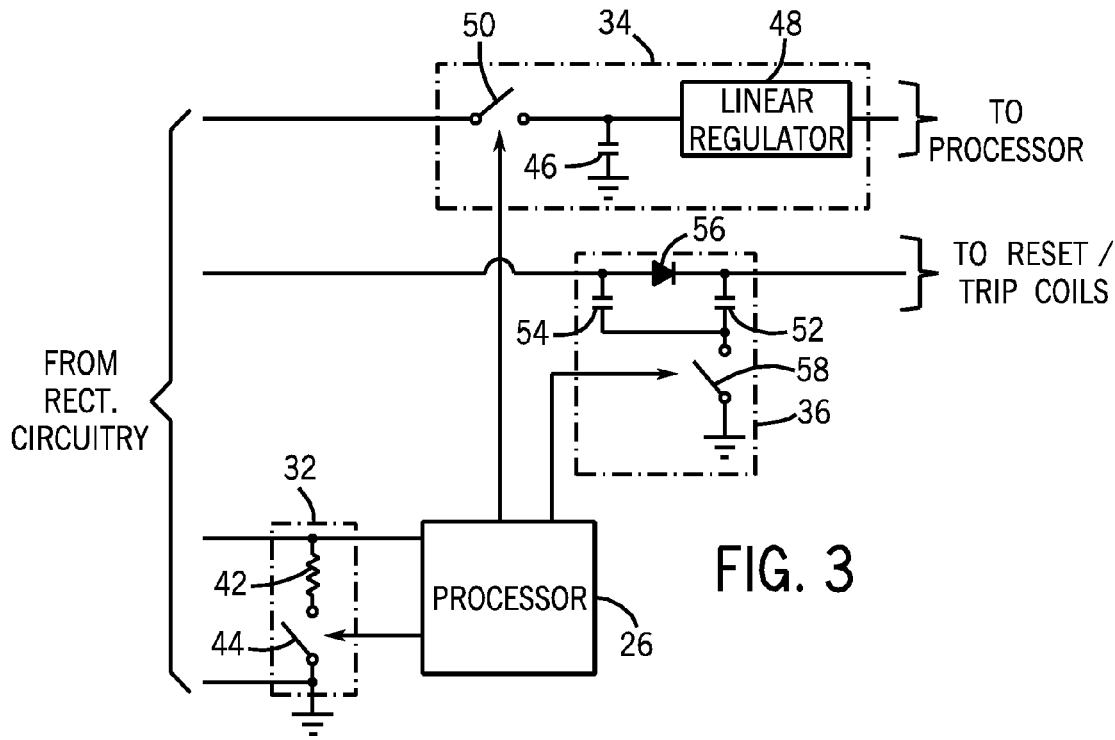
FIG. 3 is a somewhat more detailed view of the power supplies and measurement circuitry of FIG. 3 coupled to the processor.

FIG. 3 illustrates the voltage/current measurement circuit 32 and power supplies 34 and 36 in somewhat greater detail in accordance with a presently contemplated implementation. As shown in FIG. 3, the measurement circuit 32 includes a burden resistor 42 and a switch 44. Switch 44 may be any suitable switch, such as a transistor. As will be appreciated by those skilled in the art, the output of the rectification circuit 28 which serves as the input to the voltage measurement circuit 32 functionally resembles a current source with a somewhat variable voltage. The burden resistor 42 permits measurement of the line current by measuring a proportional current through the burden resistor to ground upon closing of switch 44. Opening and closing of switch 44 is controlled by processor 26 as described more fully below. Because current through the burden resistor is used to measure a voltage proportional to current, the burden resistor, if left in the circuit, represents a drain of power. By commanding switch 44 to open, the processor stops this drain and can use available power to charge components within the operational power supply 34 and the trip/reset power supply 36.

The processor 26 also controls power supplies 34 and 36 by appropriately charging components within those power supplies via switches. In the embodiment illustrated in FIG. 3, for example, power supply 34 includes a capacitor 46 which is charged to supply operational power for the device. Capacitor 46 is coupled to a linear regulator 48 which conditions and regulates the output power for operation of the processor. A switch 50, which again may be a transistor, is opened and closed by signals from processor 26. Similarly, power supply 36 includes a pair of capacitors 52 and 54 separated by a diode 56. Charging of the capacitors is regulated by operation of a switch 58 on the controller processor 26. In the present embodiment, capacitors 46, 52 and 54 provide bulk storage for charge that can be drained for operation of the circuitry in the case of capacitor 46, and for tripping (opening the contacts) of the device and resetting the device in the case of capacitors 52 and 54. The reset capacitor may be used, for example, for automatic reset of the contacts.

The processor 26 may be provided with electronically erasable programmable read-only memory, flash memory, or any other suitable memory circuitry. Programming for analyzing the current and voltage signals, and any other signals collected by the processor is stored within this memory. Moreover, for certain types of memory, reprogramming of the device may be performed by altering the programming stored within this memory, such as via an option module of the type described above with reference to FIG. 2. In operation, the processor 26 closes switch 44 to make voltage measurements (proportional to current) at intervals when switches 50 and 58 are open. Once data has been collected for the measurement, then, switch 44 may be opened, and switches 50 and 58 may be closed to store power collected by the current transformers by charging capacitors 46, 52 and 54. In the presently contemplated embodiment, for example, the switches are alternatively opened and closed to perform measurements and store power, with a measurement period occurring every 1 ms. Other intervals and periods for alternative measurement and charging may, of course, be used, and durations for measurement and charging need not be equal. Certain functions may also be set by other means, such as resets, trip classes, and so forth may be set by appropriate dip switches (not shown). These functions may be implemented by virtue of the use of the processor to control operation of the device.

Figure 4:
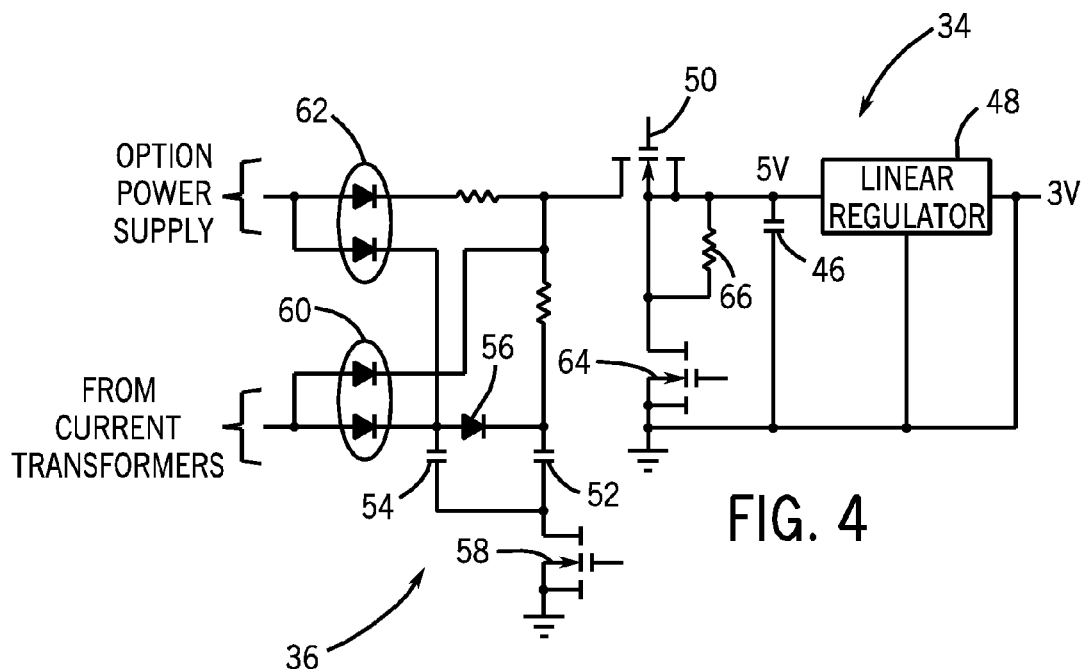
FIG. 4 is a diagrammatical representation of a circuit configuration in which power from an add-on device or option module may be used when coupled to the device of the previous figures.

In certain applications where option modules are coupled to the circuitry described above and separately powered, such as through a network, this option module power may be used instead of scavenged power from the current transformers. FIG. 4 represents exemplary circuitry for this type of alternative power configuration. As shown in FIG. 4, the power supplies 34 and 36 are essentially identical to those shown in FIG. 3. However, a pair of diodes 60 prevents power from an option module from being transmitted back to the upstream circuitry. Similarly, a pair of diodes 62 isolates the option power supply. Power supplies 34 and 36 may be powered by either the power supply or the current transformers, depending upon if the power supply that provides the higher voltage.

As compared to the circuitry shown in FIG. 3, that of FIG. 4 includes a solid state switch 64 that controls operation of switch 50. This configuration may be preferred such that switch 50 may be normally on (such as a JFET), allowing for cold start, that is, when no power is available to place the switch in a conductive state to charge the power supply. A resistor 66 is provided to hold the switch on (i.e., pull the switch down). In a presently contemplated embodiment, capacitors 46, 52 and 54 have values of 4.7 µF, 680 µF, and 680 µF, respectively, although differently sized capacitors may be employed depending upon the power needs and the power budget of the circuitry.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An electro-mechanical device comprising:
   a current transformer configured to provide power based upon current through a conductor;
   a measurement circuit coupled to the current transformer and configured to measure a current and/or voltage from the transformer;
   an operational power supply circuit configured to store an operational charge;
   a trip power supply circuit configured to store a trip charge; and
   a processor coupled to the measurement circuit and to the operational power supply circuit and to the trip power supply circuit and configured to alternatively enable measurements by the measurement circuit, to control storage of charge in an operational storage device in the operational power supply circuit, and to independently control storage of charge in a trip storage device in the trip power supply circuit.

2. The device of claim 1, comprising three current transformers configured to provide power in response to current through three phase conductors.

3. The device of claim 1, comprising rectification circuitry configured to rectify a waveform output by the current transformer to provide rectified power to the measurement circuit, the operational power supply circuit, the trip power supply circuit and the processor.

4. The device of claim 1, wherein the measurement circuit includes a burden resistor and a solid state switch, the solid state switch being coupled to the processor to selectively place the burden resistor in series between an output of the current transformer and a reference potential to permit a measurement.

5. The device of claim 1, wherein the operational power supply includes a capacitor and a solid state switch, the solid state switch being coupled to the processor to selectively place the capacitor in series between a source of power and a reference potential to charge the capacitor.

6. The device of claim 1, wherein the operational power supply circuit receives power from the current transformer.

7. The device of claim 6, wherein the operational power supply circuit receives power from a rectifier.

8. The device of claim 1, comprising an alternative power supply circuit in parallel with the power from the current transformer for providing power for charging the operational power supply.

9. The device of claim 1, wherein the trip power supply circuit stores charge at a higher voltage than the operational power supply circuit.

10. An electro-mechanical device comprising:
    a set of current transformers configured to provide power based upon current through three phase conductors;
    a rectification circuit coupled to the current transformers for converting power from the current transformers to rectified power;
    a measurement circuit coupled to the rectification circuit for measuring a signal indicative of current and/or voltage from the rectification circuit, the measurement circuit including a first solid state switch;
    a power supply circuit coupled to the rectification circuit and configured to store charge when receiving the rectified power, the power supply circuit including a second solid state switch; and
    a processor coupled to the measurement circuit and to the power supply circuit and configured to switch the solid state switches to enable measurements by the measurement circuit and alternatively to charge a storage device in the power supply circuit.

11. The device of claim 10, wherein the measurement circuit includes a burden resistor in series with the first solid state switch, the first solid state switch being coupled to the processor to selectively place the burden resistor in series between an output of the rectification circuit and a reference potential to permit measurement of the signal.

12. The device of claim 11, wherein the power supply includes a capacitor in series with the second solid state switch, the second solid state switch being coupled to the processor to selectively place the capacitor in series between an output of the rectification circuit and a reference potential to charge the capacitor.

13. The device of claim 12, comprising two power supply circuits coupled to the rectification circuit and to the processor, the power supply circuits being switched to a charging state by the processor when the measurement circuit is not performing measurements.

14. The device of claim 13, wherein the power supply circuits include an operational power supply circuit for providing power for the processor, and a trip power supply circuit for opening contacts in the device.

15. The device of claim 10, comprising an alternative power supply circuit in parallel with the power from the current transformer for providing power for charging the power supply.

16. A method for operating an electro-mechanical device, comprising:
    (a) applying a first signal from a processor to a first solid state switch of a measurement circuit to place a burden resistor in series between a supply of rectified power and a reference potential to measure a signal representative of voltage and/or current;
    (b) removing the first signal to interrupt current through the burden resistor and applying a second signal from the processor to a second solid state switch of a power supply circuit to place a storage capacitor in series between the supply of rectified power and a reference potential to charge the capacitor, the processor being powered by discharge of the capacitor.

17. The method of claim 16, comprising:
(c) removing the second signal to interrupt current to the capacitor, and reapplying the first signal as in step (a).

18. The method of claim 17, comprising cyclically repeating steps (b) and (c).

19. The method of claim 16, wherein step (b) comprises applying a third signal from the processor to a third solid state switch of a further power supply circuit to place a further storage capacitor in series between the supply of rectified power and a reference potential to charge the further capacitor, the second power supply being coupled to trip circuitry for opening contacts in the device.

20. The method of claim 19, wherein the second and third signals are applied to the second and third switches simultaneously.

21. An electro-mechanical device comprising:
a current transformer configured to provide power based upon current through a conductor;
a measurement circuit coupled to the current transformer and configured to generate measurement signals based upon current and/or voltage of a secondary of the transformer;
a processor coupled to the measurement circuit and configured to generate current measurements based upon the generated measurement signals;
an operational power supply circuit coupled to the processor and controlled by the processor to store energy for operation of the processor; and
a trip power supply circuit coupled to the processor and independently controlled by the processor to store energy for tripping the device based upon the current measurements.

22. The device of claim 21, wherein the processor is configured to alternatively command charging of the operational power supply circuit when measurement signals are not generated by the measurement circuit, and command measurement signals to be generated by the measurement circuit when the operational power supply circuit is not being charged.

23. The device of claim 22, wherein the processor alternatively commands charging of the operational power supply circuit and generation of measurement signals by changing conductive states of a solid state switch.

24. The device of claim 23, wherein the processor storage of energy in the trip power supply circuit is by control of a second solid state switch.

25. The device of claim 21, wherein the trip power supply circuit stores charge at a higher voltage than the operational power supply circuit.

26. The device of claim 21, wherein the operational power supply circuit comprises a voltage regulator, and wherein the processor controls storage of energy in the operational power supply circuit at a level reduced as compared to energy stored in the trip power supply circuit, but sufficient for operation of the voltage regulator.

27. The device of claim 26, wherein the voltage regulator is a linear regulator.

* * * * *